United States Patent
Kato (10) Patent No.: US 7,064,847 B1
(45) Date of Patent: Jun. 20, 2006

(54) COPYING SYSTEM FOR ENHANCED COLOR COPYING PROCESSOR

(75) Inventor: Tokunori Kato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/521,946

(22) Filed: Mar. 9, 2000

(30) Foreign Application Priority Data

Mar. 12, 1999 (JP) ................................. 11-066726

(51) Int. Cl.
*G06F 13/00* (2006.01)
*H04N 1/21* (2006.01)

(52) U.S. Cl. .................... 358/1.13; 358/1.15; 358/403; 399/402

(58) Field of Classification Search ............... 358/1.15, 358/1.13, 444, 403; 399/38, 75, 361, 381, 399/402, 407
See application file for complete search history.

(56) References Cited

U.S. PATENT DOCUMENTS 5,381,246 A * 1/1995 Suzuki et al. ............... 358/500
5,469,533 A * 11/1995 Dennis ....................... 358/1.15
5,717,507 A * 2/1998 Vondran, Jr. ................ 358/525
5,717,843 A * 2/1998 Tabata et al. ............... 358/1.18
5,781,310 A * 7/1998 Nakamura et al. .......... 358/468

FOREIGN PATENT DOCUMENTS

JP    A-9-214663    8/1997

* cited by examiner

*Primary Examiner*—King Y. Poon
(74) *Attorney, Agent, or Firm*—Oliff & Berridge, PLC (57) ABSTRACT

The invention provides a copying system that can perform copying processing for a color original document within a short time. In a color copying system, images on a color original document are read by a scanner of a multi-function center (MFC), as analog RGB data. The analog RGB data is converted into digital binary CMYK data by an ASIC. The converted digital binary CMYK data is transmitted to a PC. The binary CMYK data is image data that can be printed by a printer of the MFC, so that the binary CMYK data does not have to be converted in the PC. Therefore, when the binary CMYK data for all pages of the original documents is received by a color copying application of the PC, the binary CMYK data is then sequentially transmitted to the MFC in the order of printing by the printer of the MFC, according to the copying designation by an operator. The color copying system can accurately perform the copying processing for the color original document within a short time.

23 Claims, 11 Drawing Sheets

COPYING SYSTEM FOR ENHANCED COLOR COPYING PROCESSOR

BACKGROUND OF THE INVENTION

1. Field of Invention

The invention relates to a copying system including a host device, such as a personal computer, and a peripheral device connected to each other. Specially, the invention relates to a copying system capable of performing a copying processing for a color original document within a short time, even when the available memory in the peripheral device is limited.

2. Description of Related Art

Figure 10:
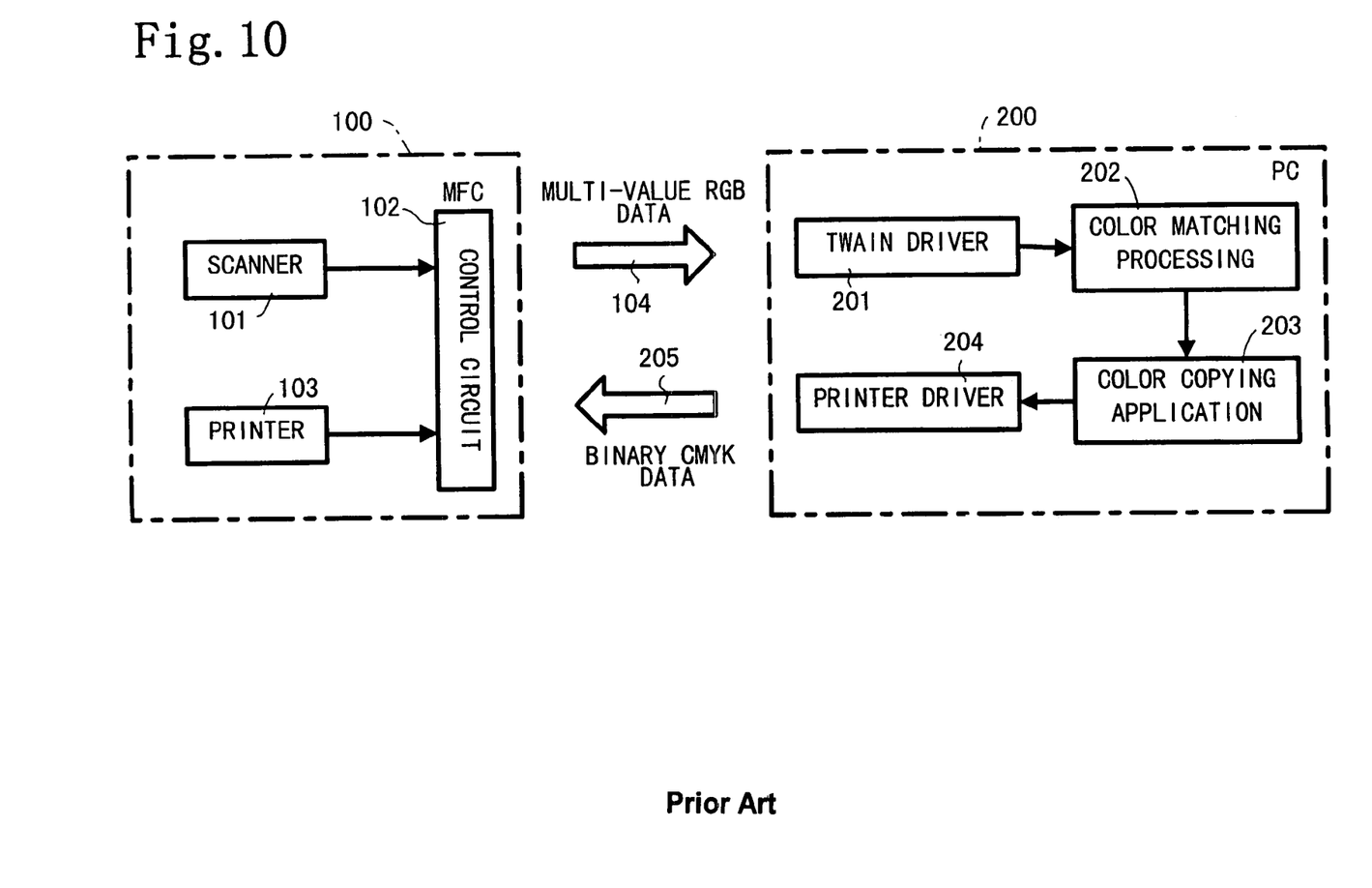
FIG. 10 is a block diagram briefly illustrating an operation of a color copying system in the prior art.

As shown in a block diagram of FIG. 10, a copying system is conventionally comprised of a multi-function center (hereinafter referred to as MFC) 100 and a personal computer 200 (hereinafter referred to as PC), as a host device connected to each other.

Figure 11:
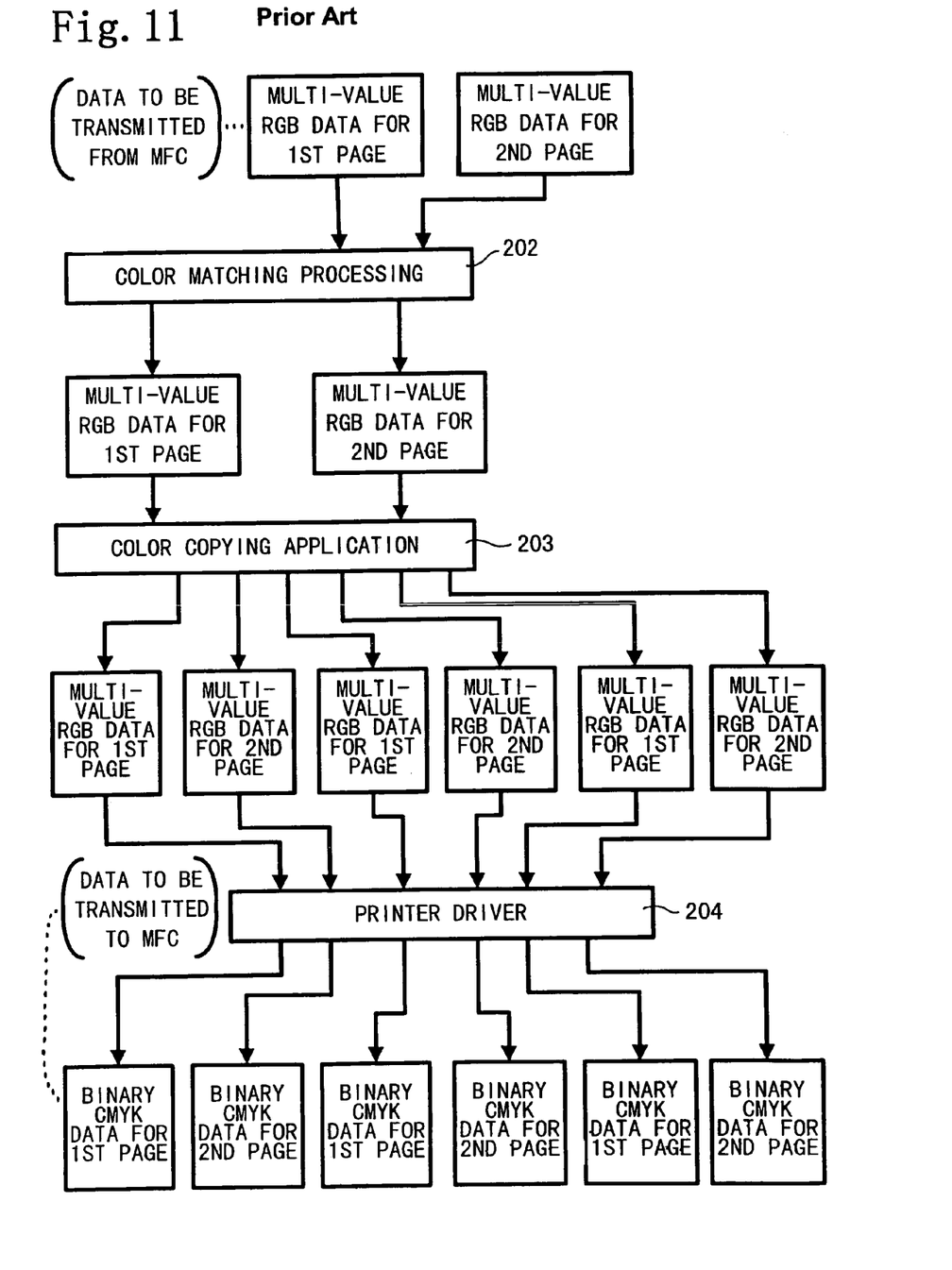
FIG. 11 is a block diagram briefly illustrating an image data processing in the PC in the prior art.

Color images on an original document are read by a scanner 101 of the MFC 100 as analog data of three colors red, green, and blue. Hereinafter, red, green, and blue are referred to as "R", "G", and "B", respectively. The analog RGB data is converted by a control circuit 102 into multi-value 8-bit digital RGB data, and is transmitted to the PC 200 (104). The multi-value RGB data transmitted to the PC 200 is received via a TWAIN driver 201. Thereafter, the multi-value RGB data is subjected to a color matching processing 202, and is output to a color copying application 203. The multi-value RGB data underwent the color matching processing 202 and output to the color copying application 203, is then output to a printer driver 204, as the copying designation by an operator. Further, the multi-value RGB data is converted by the printer driver 204 into 1-bit binary data of four colors of cyan, magenta, yellow, and black, that can be printed in a printer 103 of the MFC 100. Hereinafter, cyan, magenta, yellow, and black are referred to as "C", "M", "Y", and "K", respectively. The binary CMYK data is then transmitted to the MFC 100 (205). The binary CMYK data transmitted to the MFC 100 is output from the control circuit 102 to the printer 103. The printer 103 performs color printing. FIG. 11 shows a manner when three copies of a total of two pages of original documents are produced in the sort copying mode, according to the designation by an operator.

The amount of image data of a color original document is large. For example, the amount of the image data for a A4-sized color original document will be approximately 10 Mbyte. A peripheral device of the MFC 100 has a memory therein whose size is not so large that the available memory will be limited. The PC 200 usually has a large-capacity memory. Therefore, by constructing the above-described color copying system in the following manner, the color copying processing can be smoothly performed. The color image data obtained by reading a color original document by the scanner 101 of the MFC 100 is transmitted to the PC 200 and is temporarily stored therein. The data is sorted in the PC 200, and is then sent back to the MFC 100. The data sent back from the PC 200 is printed in color by the printer 103 of the MFC 100. With the above-described construction, the color copying processing for the color original document with the large amount of image data, can be smoothly performed in the MFC 100, via the PC 200, by using the memory in the PC 200, even though the memory size in the MFC 100 is limited.

However, in the above-described color copying system, the multi-value RGB data has to undergo the color matching processing 202 and then has to be converted into the binary CMYK data by the printer driver 204 in the PC 200. These steps lead to the longer color copying processing time. In addition, the multi-value RGB data is larger in size, as compared with the binary CMYK data. Therefore, it takes time to send such large multi-value RGB data in size from the MFC 100 to the PC 200.

The color matching processing 202 is a collection processing performed for the multi-value RGB data on a pixel basis according to a display driver of the PC 200, to show the images on a display in the PC 200. The color matching processing 202 requires a relatively long time, though this is unnecessary for color printing. That is, the color matching processing 202 is not needed in the case where an operator does not require the indication of the images on the display but requires the color copy thereof. To the contrary, the conversion of the multi-value RGB data into the binary CYMK data is necessary for color printing, and is performed by the printer driver 204 as described above. However, as shown in FIG. 11, the printer driver 204 has to convert the multi-value RGB data into the binary CMYK data for the total of six pages (2 pages X 3 copies), even though the original document is only two pages, as the operator designates the three copies of a total of two pages of the original documents. This also leads to the longer color copying processing time.

SUMMARY OF THE INVENTION

One aspect of the invention is to provides a copying system that can perform color copying processing for a color original document within a short time.

The color copying system of the invention may include a host device and a peripheral device connected to the host device and having a printing device. The peripheral device may include a reading device that reads an image on an original document as image data, a converting device that converts the image data read by the reading device into printable data that can be printed by the printing device, a first transmission device that transmits to the host device the printable data converted by the converting device, and a reception printing device that receives the printable data from the host device and causes the printing device to print the printable data. The host device may include a storage device that stores various data, a reception control device that receives the printable data transmitted from the first transmission device and stores the printable data in the storage device, and a second transmission device that transmits to the peripheral device the printable data stored in the storage device by the reception control device.

In the copying system, the image on the original document is read by the reading device, as the image data. The image data is converted by the converting device, into the printable data that can be printed by the printing device. Thereafter, the printable data is transmitted by the first transmission device, from the peripheral device to the host device. The data transmitted by the first transmission device, is received by the reception control device and temporarily stored in the storage device. The data stored in the storage device, is transmitted by the second transmission device, from the host device to the peripheral device. The data is received by the reception printing device and output to the printing device. Then, the data is printed by the printing device.

BRIEF DESCRIPTION OF THE DRAWINGS

Preferred embodiments of the invention will be described in detail with reference to the following figures, wherein.

DETAILED DESCRIPTION OF PREFERRED EMBODIMENTS

Preferred embodiments of the invention will be described in detail with reference to FIGS. 1–8. A color copying system 80 according to an embodiment, includes a multi-function center (hereinafter referred to as the MFC) 1 and a personal computer 50 (hereinafter referred to as the PC) connected to each other. The MFC 1 is a peripheral device having a plurality of functions, for example, a scanner function, a printer function, a copying function, a modem function, and a facsimile function.

Figure 1:
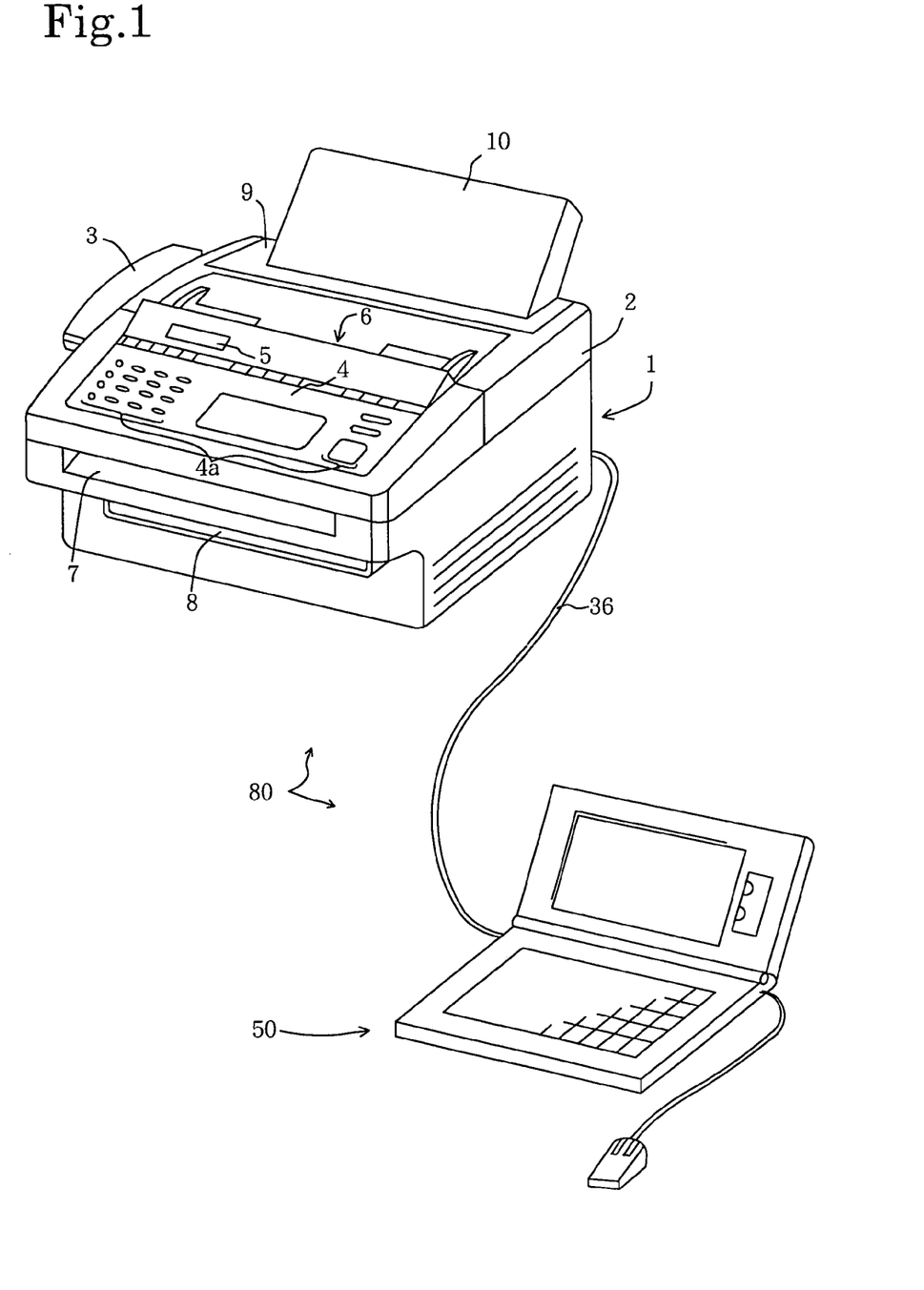
FIG. 1 is a perspective view of a color copying system including a multi-function center (MFC) and a personal computer (PC), according to an embodiment of the invention.

FIG. 1 shows the perspective view of the color copying system 80. The MFC 1 is provided with a handset 3 at a side of the body housing 2. The handset 3 is placed on a hook (not shown) provided on the body housing 2 when a telephone conversation is not made, and the handset 3 is picked up and off the hook during a telephone conversation. The former is called an "on-hook" condition. The latter is called an "off-hook" condition.

Provided on an upper front portion of the body housing 2 is a control panel 4 having a plurality of keys 4a. At the left-end portion of the control panel 4, a liquid crystal display (LCD) 5 is provided. The keys 4a are pressed down for the MFC 1 to perform operations. The LCD 5 shows, for example, operation conditions of the MFC 1 and operation procedures.

An original document insertion opening 6 is provided at the rearward portion of the control panel 4 and the LCD 5. An original document is inserted facing down into the original document insertion opening 6, when facsimile data of the original document is transmitted to another facsimile apparatus or the original document is copied. The original document inserted into the original document insertion opening 6, is read by a scanner 22 (see FIG. 2), as image data. Thereafter, the original document is discharged from an original document discharge opening 7 provided on the front face of the body housing 2 below the control panel 4. At the rearward portion of the original document insertion opening 6, a sheet holder mounting portion 9 is provided. To the sheet holder mounting portion 9, a sheet holder 10 capable of holding a stack of recording sheets, is removably set. The recording sheet supplied from the sheet holder 10 and subjected to printing by a printer 25 (see FIG. 2), is discharged from a recording sheet discharge opening 8 disposed below the original document discharge opening 7.

Provided on the back of the body housing 2 is a connector (not shown) for a PC interface 35 as a port. The MFC 1 is connected to the PC 50, via a cable 36 connected to the PC interface 35. The MFC 1 and the PC 50 may be connected not via the cable 36 but an optical signal of, for example, infrared rays.

Figure 2:
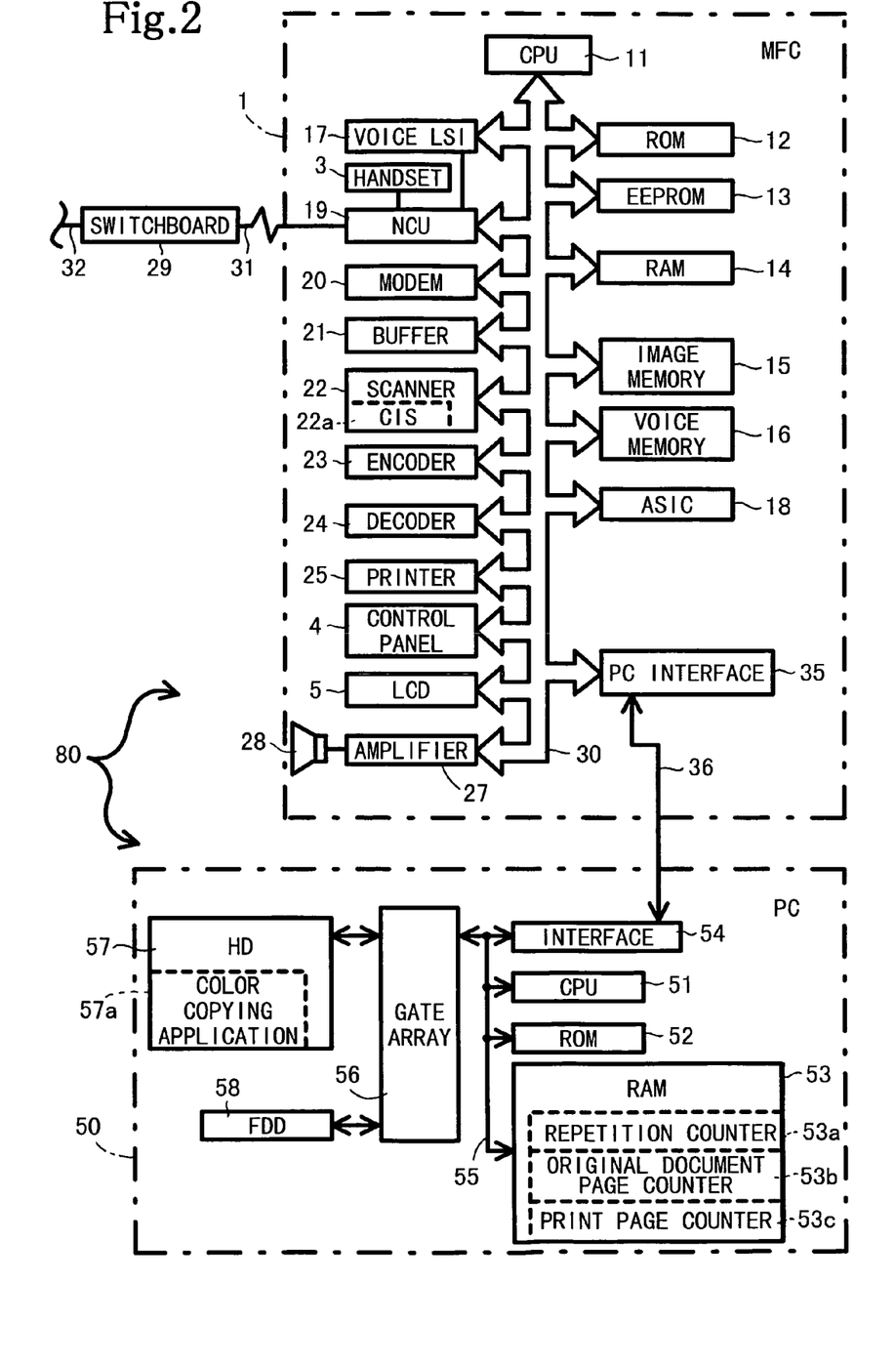
FIG. 2 is a block diagram illustrating the electrical arrangement of the color copying system.

FIG. 2 is a block diagram illustrating the electrical arrangement of the color copying system 80. The MFC 1 includes the following components: a central processing unit (CPU) 11; a read-only memory (ROM) 12; an electrically erasable programmable read-only memory (EEPROM) 13; a random-access memory (RAM) 14; an image memory 15; a voice memory 16; an application-specific integrated circuit (ASIC) 18; a PC interface 35; a voice LSI 17; a network control unit (NCU) 19; a modem 20; a buffer 21; a scanner 22; an encoder 23; a decoder 24; a printer 25; a control panel 4; a liquid crystal display (LCD) 5; and an amplifier 27. These components are connected to each other via a bus line 30.

The NCU 19 performs the network controls. The MFC 1 is connected to a telephone line 31, via the NCU 19. The NCU 19 receives various signals, for example, a ringing signal transmitted from a switchboard 29. The NCU 19 also transmits to the switchboard 29 a dial signal at the start of a call according to the operation of the keys 4a provided on the control panel 4. Further, the NCU 19 receives and transmits an analog voice signal during a telephone conversation.

Figure 6:
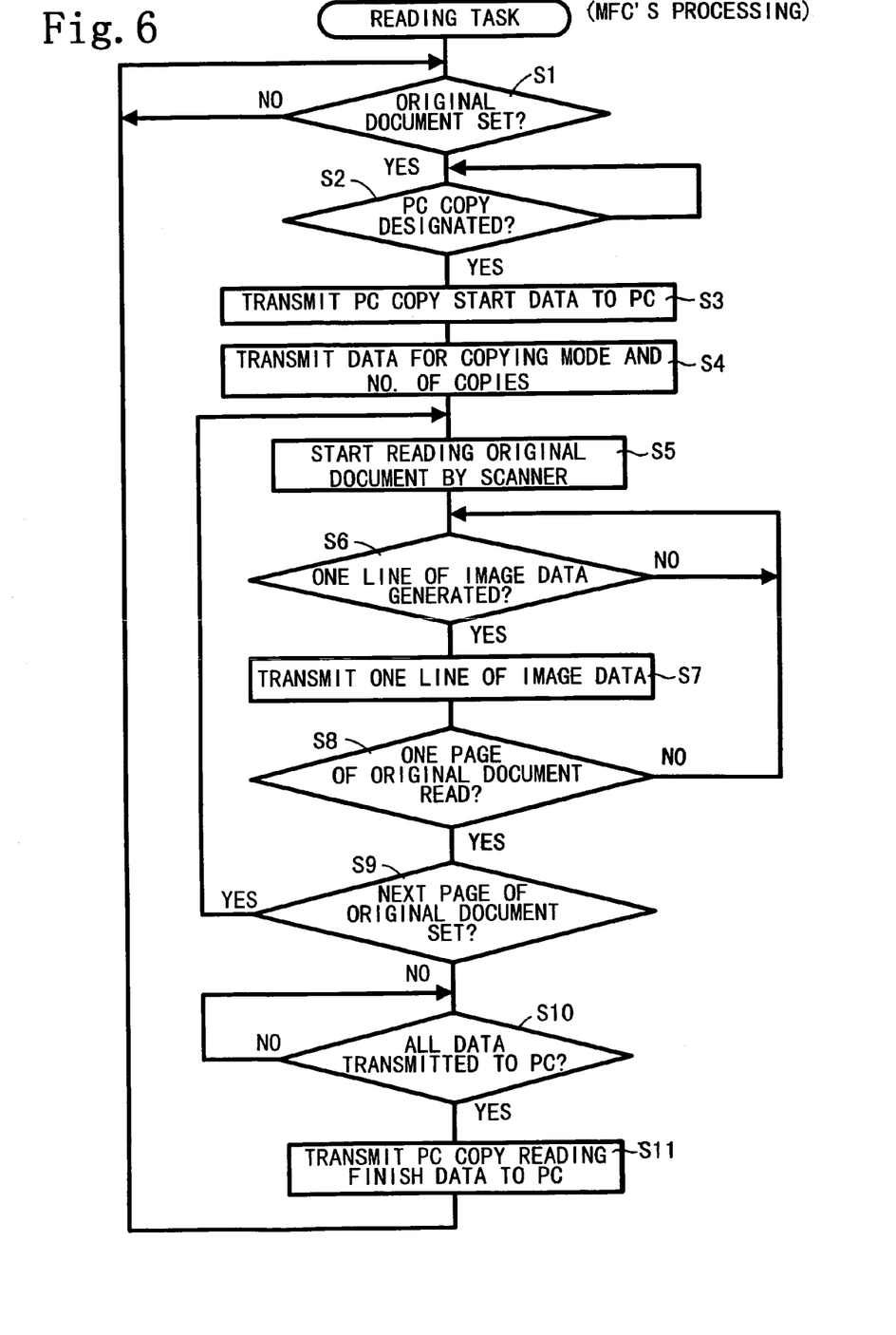
FIG. 6 is a flowchart illustrating a reading task executed by the MFC.
Figure 7:
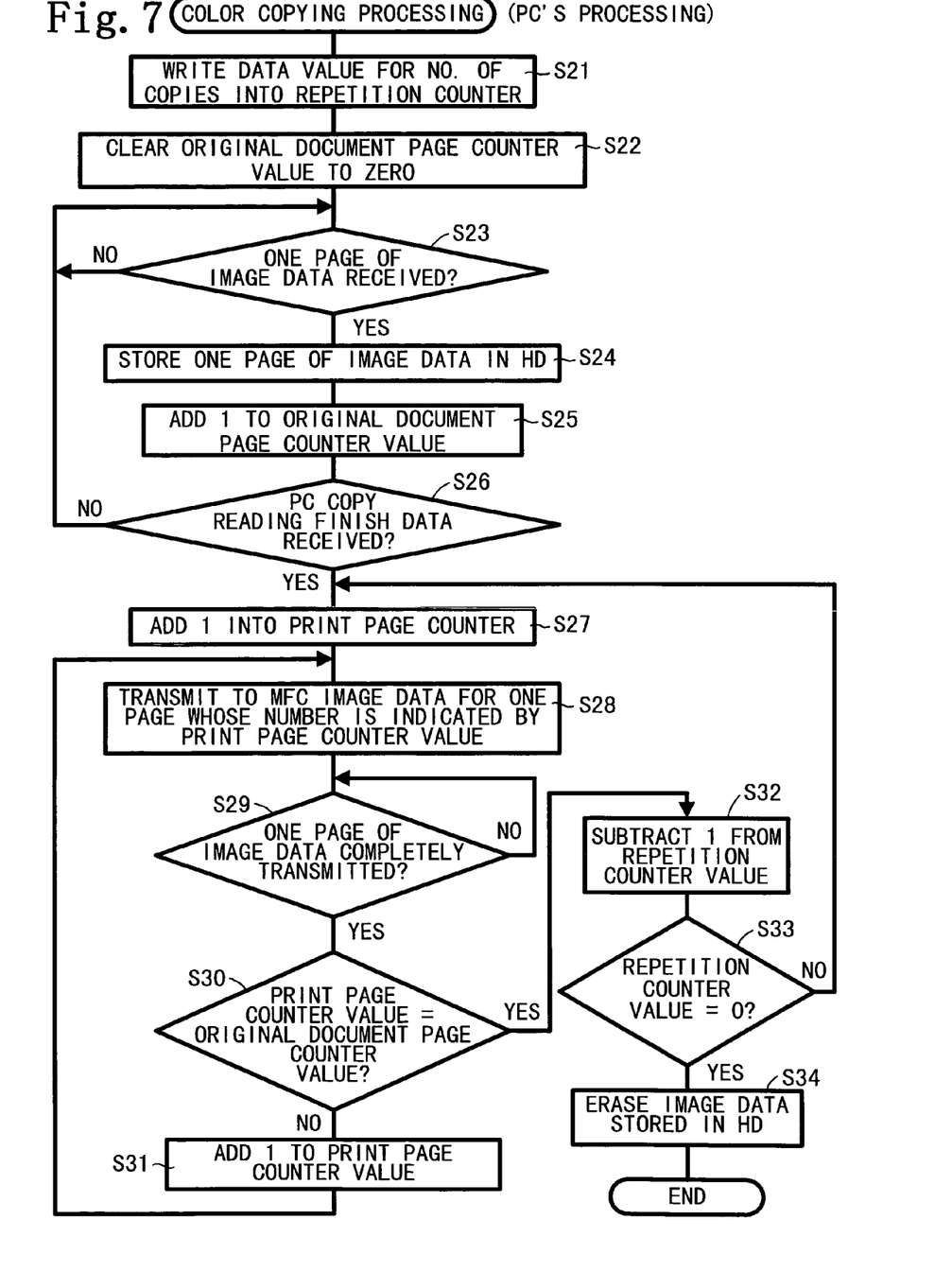
FIG. 7 is a flowchart illustrating one of color copying processing executed by the color copying application in the PC.
Figure 8:
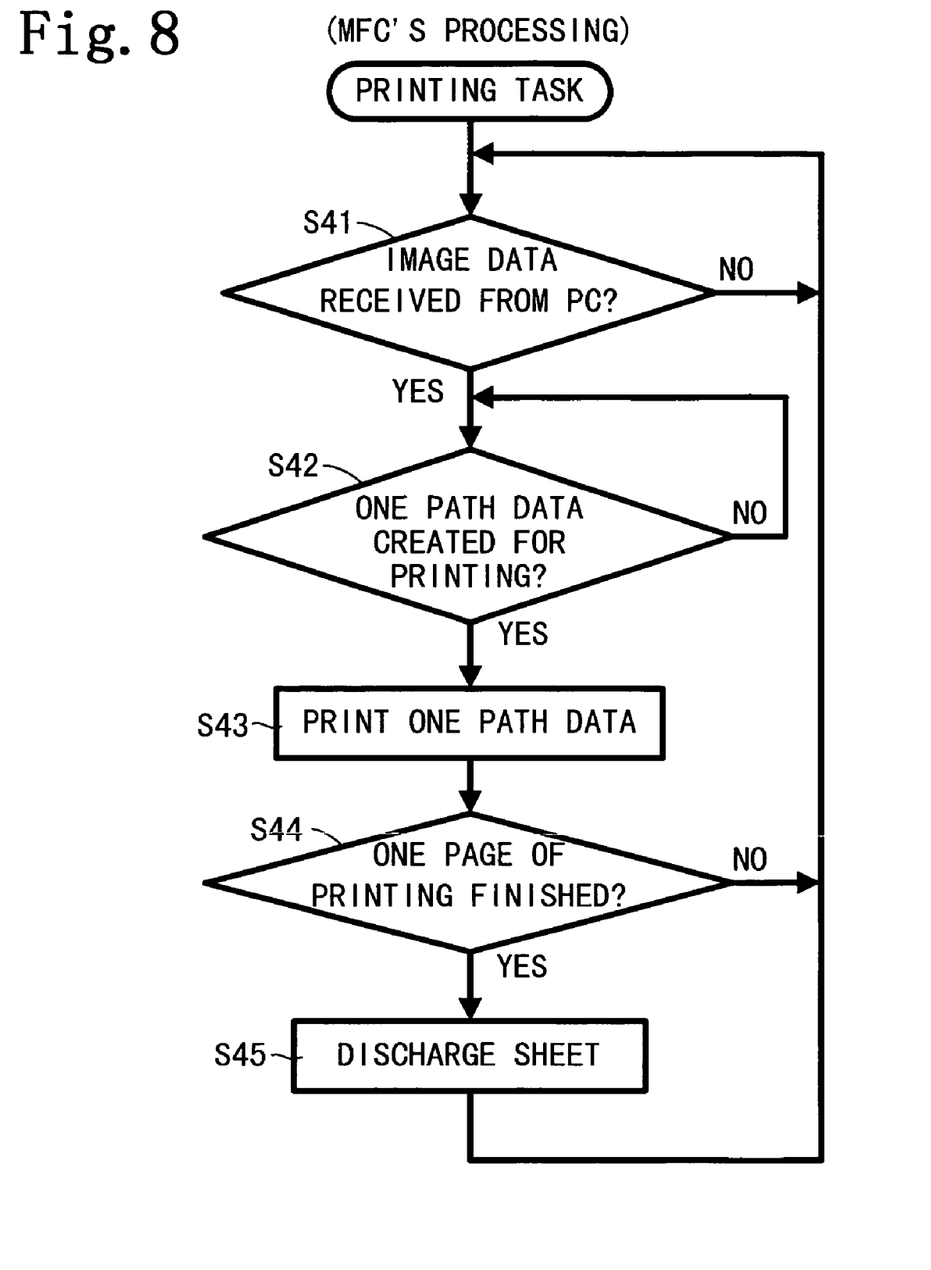
FIG. 8 is a flowchart illustrating a printing task executed by the MFC.

The CPU 11 executes the various operations, for example, scanning, printing, copying, and facsimile operations, based on control programs stored in the ROM 12 by controlling the relevant components connected by the bus line 30. The ROM 12 is a non-rewritable memory that stores the control programs executed by the MFC 1. The tasks shown in the flowcharts in FIGS. 6–8 are performed based on the programs stored in the ROM 12. The EEPROM 13 is a non-volatile rewritable memory, so data stored therein is not lost even if the MRC 1 is power down. The RAM 14 is a volatile rewritable memory. The RAM 14 temporarily stores the various data when the MFC 1 executes an operation.

The image memory 15 is a memory for storing communication records, image data, and a bit image for printing. For the image memory 15, a large-capacity and low-priced dynamic RAM (DRAM) is used. The image memory 15 stores the image data obtained by reading an original document by the scanner 22, the image data of a received facsimile, and print data transmitted from the PC 50. The voice memory 16 stores a response message sent out to a receiver-side apparatus and an incoming message from the receiver-side apparatus, via the telephone lines 31, 32. Similar to the image memory 15, a large-capacity and low-priced dynamic RAM (DRAM) is used for the voice memory 16. The incoming message stored in the voice memory 16 is erased therefrom by an erasing operation performed via the control panel 4, or by receiving an erase command sent from the other apparatus connected to the telephone lines 31, 32.

The voice LSI 17 performs a voice recognition processing to convert an analog voice signal received by the NCU 19, into a digital voice signal, and a voice synthesis processing to convert the digital voice signal generated in the MFC 1, into the analog voice signal and to output to the NCU 19 or the speaker 28 (amplifier 27).

The PC interface 35 is a parallel interface of, for example, the Centronics type. The MFC 1 is connected to the PC 50 by the cable 36 connected to the PC interface 35. The MFC 1 transmits to and receives from the PC 50 the image data or various commands, via the cable 36.

The modem 20 modulates and demodulates image data and communication data and allows the transfer of the data. The modem 20 also sends and receives various kinds of transmission control signals. The buffer 21 temporarily stores data including coded image data transmitted to and received from an another apparatus, and the data demodulated by the modem 20. The encoder 23 encodes the image data obtained by reading an original document by the scanner 22, so as to compress the image data for the facsimile transmission. The decoder 24 decodes the encoded image data stored in the buffer 21 or the image memory 15. The amplifier 27 outputs ringing tones and voices which sound through the speaker 28 connected thereto.

The scanner 22 reads a color original document inserted into the original document insertion opening 6, as color image data. The scanner 22 includes a contact image sensor (CIS) 22a. By the CIS 22a, the color original document is read as analog data of the three colors, red, green, and blue. Hereinafter, red, green, and blue are referred to as "R", "G", and "B", respectively. The printer 25 may be an ink-jet printer capable of performing printing in color. Four inks of cyan, magenta, yellow, and black are used for color printing in the printer 25. Hereinafter, cyan, magenta, yellow, and black are referred to as "C", "M", "Y", and "K", respectively. The color printing may be performed using six color inks including light cyan (LC) and light magenta (LM) color inks, in addition to CMYK color inks. The ASIC 18 converts analog RGB data obtained by reading the original document by the scanner 22, into multi-value 8-bit digital RGB data or 1-bit digital binary CMYK data. The ASIC 18 is designed specifically for the MFC 1, so that the conversion can be performed speedily and accurately.

Figure 3:
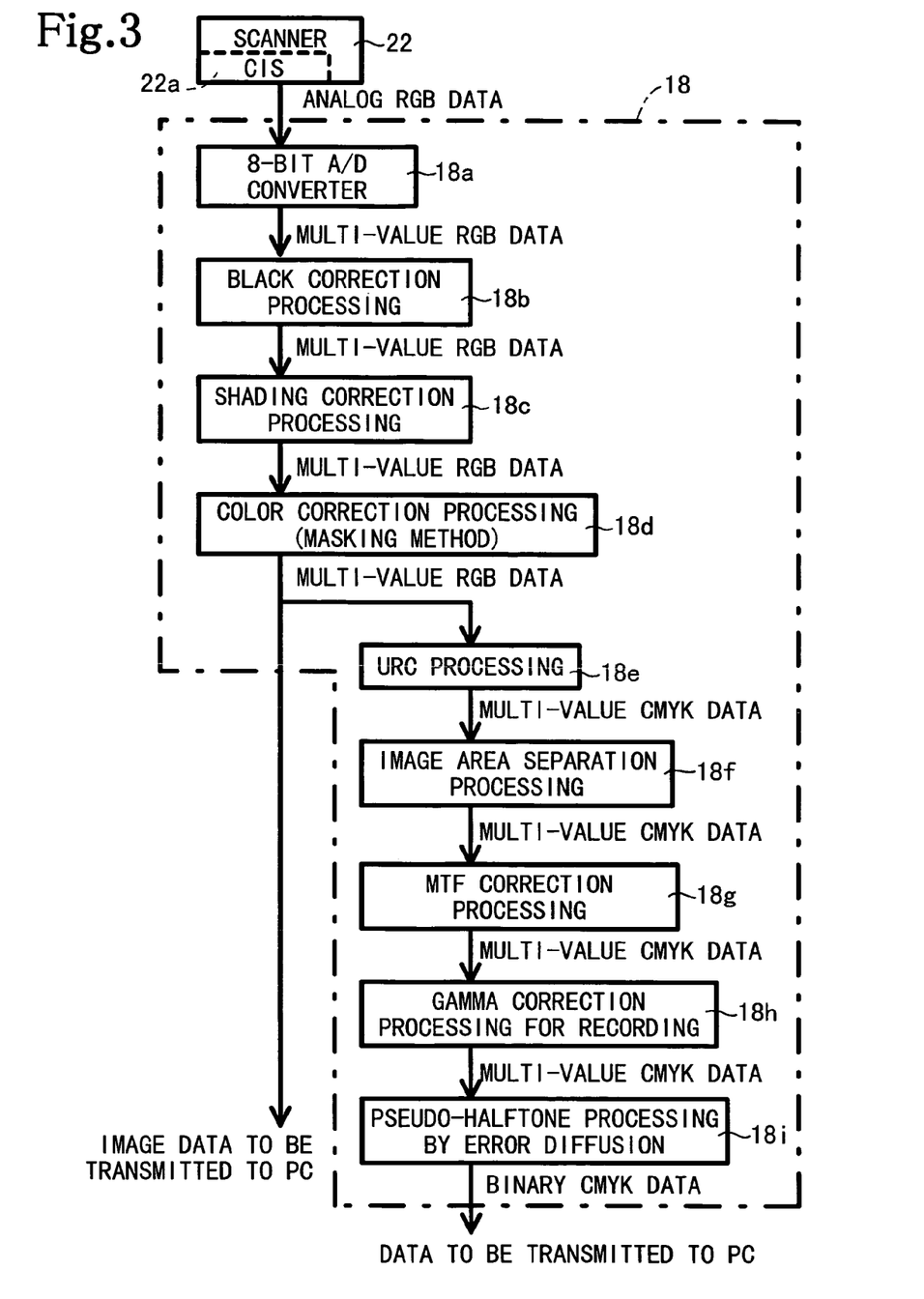
FIG. 3 is a block diagram briefly illustrating the image data processing by an application-specific integrated circuit (ASIC) of the MFC.

With reference to FIG. 3, the functions of the ASIC 18 will be described below. The images on the color original document are read by the CIS 22a of the scanner 22, and are output to the ASIC 18 as analog RGB data. The analog RGB data is converted into multi-value 8-bit digital RGB data, by an 8-bit A/D converter 18a of the ASIC 18. Thereafter, the multi-value 8-bit digital RGB data is subjected to various correction processing, such as a black correction processing 18b, a shading correction processing 18c, and a color correction processing 18d, so that the image data is now converted and processed in the form that can be transmitted to the PC 50. The image data obtained by reading the original document by the scanner 22 of the MFC 1, is normally transmitted to the PC 50, after the multi-value RGB data underwent the color correction processing 18d. As shown in FIG. 10, the multi-value RGB data (104) conventionally transmitted from the MFC 100 to the PC 200 corresponds to the data subjected to the above-described various correction processing.

In the embodiment, when the image data obtained by reading the original document by the scanner 22 is printed using the printer 25, the multi-value RGB data underwent the color correction processing 18d and is further subjected to an under color remover (UCR) processing 18e and is converted into multi-value 8-bit CMYK data. Thereafter, the multi-value 8-bit CMYK data is subjected to an image area separation processing 18f, an MTF correction processing 18g, a gamma correction processing for recording 18h, and a pseudo-halftone processing by error diffusion 18i. The multi-value 8-bit CMYK data is converted into the binary CMYK data. The above-described processing and conversion are performed all by the ASIC 18. The binary CMYK data is the image data that can be printed by the printer 25. In the color copying system 80 according to the embodiment, the multi-value RGB data does not undergo the color correction processing 18d, but the binary CMYK data is transmitted to the PC 50.

The above-described MFC 1 is connected to the telephone line 31, via the NCU 19, as shown in FIG. 2. The telephone line 31 is connected to the switchboard 29 on the side of the MFC 1. The switchboard 29 is connected to an another switchboard, via the telephone line 32. To the other switchboard, a receiver-side apparatus (for example, an another MFC 1 or facsimile apparatus) is connected via the telephone line.

The PC 50 connected to the MFC 1 includes the following components: a central processing unit (CPU) 51; a read-only memory (ROM) 52; a random-access memory (RAM) 53; an interface 54; a gate array 56; a hard disk 57 (hereinafter refereed to as the HD); and a floppy disk drive 58 (hereinafter referred to as the FDD). The CPU 51, ROM 52, RAM 53, interface 54, and gate array 56 are connected to each other, via a bus line 55. The CPU 51 is a processing unit that performs various controls and arithmetic computations based on basic programs stored in the ROM 52, an operating system (OS) and various application programs stored in the HD 57, and a program supplied from a floppy disk via the FDD 58. The ROM 52 is a non-volatile non-rewritable memory that stores the basic programs to operate the CPU 51 and various data. The RAM 53 is a volatile rewritable memory. The RAM 53 temporarily stores various data when the CPU 51 executes a program. The various programs supplied via the HD 57 or supplied from a floppy disk via the FDD 58 may be loaded in the RAM 53, and are performed by the CPU 51.

The RAM 53 temporarily includes a repetition counter 53a, an original document page counter 53b, and a print page counter 53c when the color copying processing (FIG. 7) is executed by the color copying application 57a stored in the HD 57. The counters 53a, 53b, 53c are used by the color copying application 57a.

The repetition counter 53a is a counter for storing the number of copies. The number of copies is input by an operator, via the control panel 4 of the MFC 1 in the embodiment. The input data for the number of copies is transmitted to the PC 50 from the MFC 1 (S4), before the image data of the original document is transmitted. The data for the number of copies is stored in the repetition counter 53a (S21). The designations for the copying processing, such as the number of copies, may be made via a keyboard of the PC 50.

The original document page counter 53b is a counter for storing the number of original documents to be copied. The initial value for the original document page counter 53b is set to zero (0) (S22). Every time one page of the image data is received from the MFC 1, one (1) is added to the value in the counter 53b (S25). The print page counter 53c is a counter that counts the number of printed pages. The image (print) data transmitted to the MFC 1 from the PC 50 is printed by the printer 25 of the MFC 1. Therefore, the number of pages of the image (print) data transmitted from the PC 50 to the MFC 1 is counted as the number of the printed/recorded pages.

The interface 54 is a parallel interface of, for example, the Centronics type. The PC 50 is connected to the MFC 1, via the cable 36 connected to the interface 54, so that the data can be transmitted to and received from the MFC 1. The gate array 56 serves as the interface between the CPU 51, the HD 57, and the FDD 58.

The HD 57 is a large-capacity rewritable memory for storing an operating system (OS) of the PC 50 and various application programs. The image data transmitted from the MFC 1 to the PC 50, is temporarily stored in the HD 57. Generally, the amount of the color image data is large. For example, the amount of the image data for a A4-sized color original document will be approximately 10 Mbyte. The image memory 15 of the MFC 1 can store only the color image data of approximately two pages of the A4-sized original documents. Therefore, in the color copying system 80, the image data is temporarily stored in the HD 57 of the PC 50 when the color copying processing is performed. In addition to the image data, which are temporarily stored in the HD 57, the color copying application 57a that executes the color copying processing shown in FIG. 7, is also stored therein.

The FDD 58 is a drive for reading programs and data stored in a floppy disk installed in the FDD 58 or for writing a program or data in the floppy disk.

Figure 4:
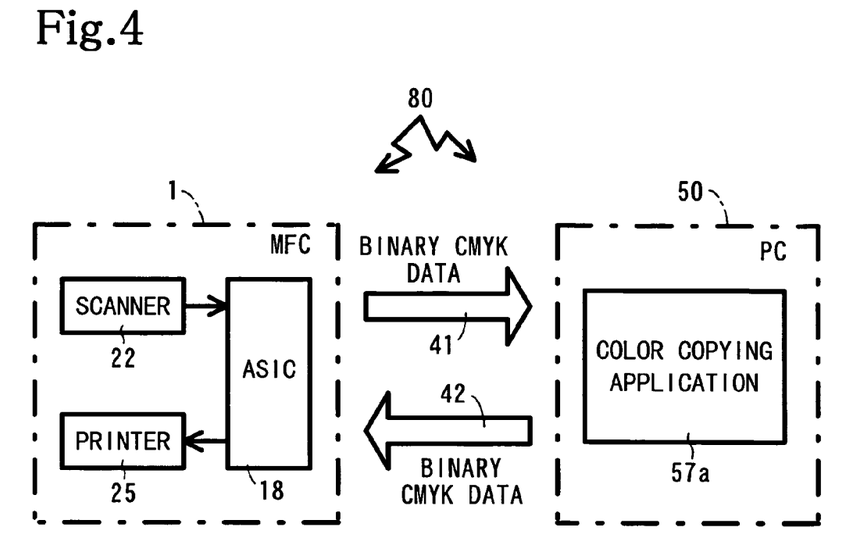
FIG. 4 is a block diagram briefly illustrating an operation of the color copying system.
Figure 5:
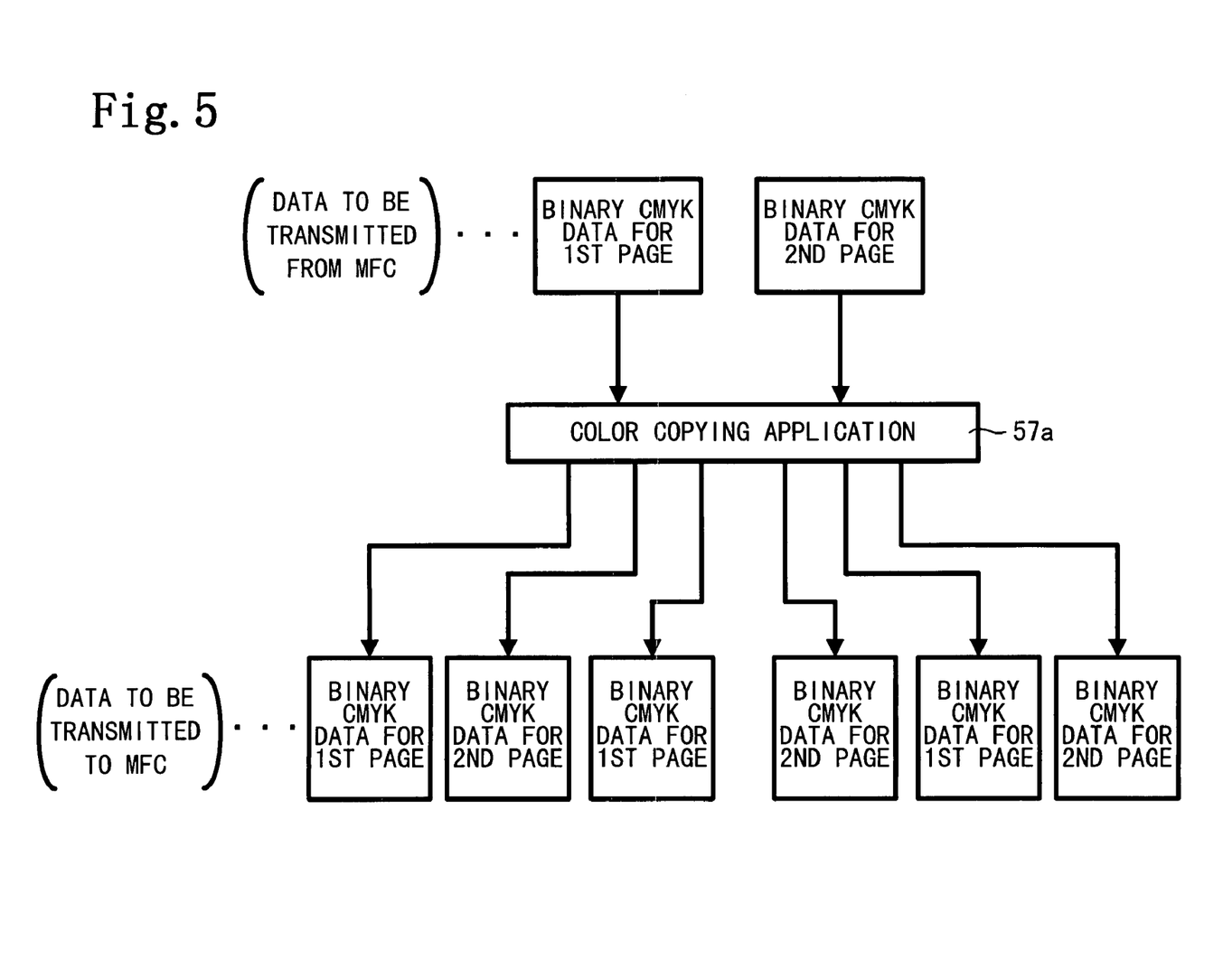
FIG. 5 is a block diagram illustrating data input to/output from a color copying application.

With reference to FIG. 4, the functions of the above-constructed color copying system 80 will be briefly described. In the color copying system 80, images on a color original document are read by the scanner 22 of the MFC 1, as analog RGB data. The analog RGB data is converted into digital binary CMYK data by the ASIC 18. The converted digital binary CMYK data is transmitted to the PC 50 (41). The binary CMYK data is image data that can be printed by the printer 25, so that the binary CMYK data does not have to be converted in the PC 50. Therefore, when the binary CMYK data for all pages of the original documents is received by the color copying application 57a of the PC 50, the binary CMYK data is then sequentially transmitted to the MFC 1 in the order of printing by the printer 25 of the MFC 1, according to the copying designation by the operator (42). FIG. 5 shows the operation manner of the color copying application 57a when three copies of total of two pages of original documents are copied in a sort copying mode.

The color copying system 80 does not require the color matching processing 202 (FIG. 10) that is conventionally performed in the PC 50. In addition, the conversion of the multi-value RGB data into the binary CMYK data, is conventionally performed for all pages of the copies to be produced (see FIG. 11), however, such conversion is performed only for the number of original documents by the ASIC 18. By the use of an integrated circuit of the ASIC 18 specifically designed for the MFC 1, the conversion of the multi-value RGB data into the binary CMYK data, can be performed speedily and accurately. Accordingly, the color copying system 80 of the embodiment speedily and accurately performs the copying processing for a color original document, regardless of the memory capacity in the MFC 1, so that high image quality outputs of copy images (print results) can be obtained within a short time.

Generally, two copying modes can be used when a plurality of copies of an original document are produced in the multi-copying processing: stack copying mode and sort copying mode.

For example, when three (3) copies of one page each of the original documents A and B (total of 2 pages) are designated and copied using the stack copying mode, images read from the original A are consecutively duplicated on three sheets of the recording paper. Then, images read from the original document B are consecutively duplicated on three sheets of the recording paper. In other words, in the stack copying mode, images on an original document are consecutively duplicated on the required number of recording paper to produce the designated number of copies. On the other hand, when three (3) copies of one page each of the original documents A and B (total of 2 pages) are designated and copied using the sort copying mode, for example, images read from the original document A are duplicated on one sheet of the recording paper. While the image data of the original document A is stored in a memory, images read from the next original document B are duplicated on another sheet of the recording paper. Thus, one copy of the original documents A and B is produced. Thereafter, the other one (1) copy is produced in the same manner as described above, based on the stored image data of the original documents A and B.

In this embodiment, the color copying processes that the color copying system 80 performs, for example, in the sort copy mode will be explained below, with reference to the flowcharts shown in FIGS. 6–8. FIG. 6 is a flowchart illustrating a reading task executed by the MFC 1. In the reading task, the CPU 11 first determines that an original document is set into the original document insertion opening 6 (S1). The CPU 11 repeats step S1 until the original document is set thereinto. When the original document is set into the original document insertion opening 6 (S1: YES), the CPU 11 repeats step S2 until an operator designates a PC copy where color copying is performed via the PC 50. The PC copy may be designated by the operator, via the control panel 4 of the MFC 1 or the PC 50 as described above. The copying mode, such as the sort copying mode and the stack copying mode, and the number of copies, are also designated at the time when the PC copy is designated. In this embodiment, three (3) copies are produced in the sort copying mode (the copying mode is the sort copying mode, and the number of copies is three (3)).

When the PC copy is designated by the operator (S2: YES), the CPU 11 transmits the PC copy start data to the PC 50 (S3). The CPU 11 also transmits to the PC 50 the data for the copying mode, which is designated by the operator (the data indicating that the copying mode is sort copying mode) and data for the number of copies (the data indicating the number of copies is three (3)) (S4). When the PC 50 receives the PC copy start data, the PC 50 starts the color copying processing shown in FIG. 7, which will be described below in detail. In the color copying processing, the value in the received data for the number of copies (3), is written into the repetition counter 53a.

The MFC 1 then feeds the original documents to the scanner 22 and starts reading images on the original documents by the CIS 22a (S5). As described above, the image data obtained by reading the original documents by the CIS 22a, is the analog RGB data. The analog RGB data is converted by the ASIC 18 into the digital binary CMYK data. As described above, the ASIC 18 is designed specifically for the MFC 1, so that the conversion can be performed speedily and accurately. As the conversion proceeds and one line of the image data is generated by the ASIC 18 (S6: YES), the CPU 11 transmits the generated one line of the image data to the PC 50 (S7).

The CPU 11 repeats the steps S6 and S7, until one page of the original document is read (S8: NO). When one page of the original document is completely read (S8: YES), the CPU 11 determines whether the next page of the original document is set into the original document insertion opening 6 (S9). When the next page of the original document is set into the original document insertion opening 6 (S9: YES), the CPU 11 repeats the steps S5 to S8, until all pages of the original documents are completely read. In this embodiment, since the total number of the original documents are two (2), the steps S5 to S8 will be repeated twice.

When all pages of the original documents are completely read (S9: YES), it is determined whether all the binary CMYK data is transmitted to the PC 50 from the MFC 1 (S10). When all the binary CMYK data is completely transmitted to the PC 50 from the MFC 1 (S10: YES), the CPU 11 transmits to the PC 50 the PC copy reading finish data that indicates the original documents are finished being read (S11). Thereafter, the CPU 11 repeats step S1 until another set of original documents are set into the original document insertion opening 6.

FIG. 7 is a flowchart illustrating color copying processing executed by the color copying application 57*a* stored in the HD 57 of the PC 50. The color copying processing, such as shown in FIG. 7, starts when the PC 50 receives from the MFC 1 the PC copy start data and the data for the copying mode in which the sort copying mode is designated.

In the color copying processing, the PC 50 first receives the data for the number of copies (3) from the MFC 1. The CPU 51 writes the value (3) for the number of copies into the repetition counter 53*a* (S21). The CPU 51 initializes the original document page counter 53*b* by clearing the value in the counter 53*b* to zero (S22). Then, the CPU 51 repeats step S23 until one page of the image data (binary CMYK data) is received. When one page of the image data is received (S23: YES), the CPU 51 stores the one page of the image data in the HD 57 (S24), and adds one (1) to the value in the original document page counter 53*b* (S25). Then, the CPU 51 determines whether the PC copy reading finish data transmitted from the MFC 1, is received (S26). If the PC copy reading finish data has not yet been received (S26: NO), the image data for one or more pages exists. Therefore, the CPU 51 repeats steps S23 to S25 for the existing image data. In this embodiment, since the total number of the original documents are two pages, the value in the original document page counter 53*b* is finally added up to two (2).

Upon the reception of the PC copy reading finish data (S26: YES), the image data (binary CMYK data) for all of the original documents have been received. Thereafter, the CPU 51 executes a processing to transmit the received image data to the MFC 1 in the order of printing, according to the operator's designation. First, the CPU 51 writes one (1) into the print page counter 53*c* (S27). Then, the CPU 51 reads from the HD 57 the image data (binary CMYK data) for the "n"th page indicated by the value "n" in the print page counter 53*c*, and transmits the image data to the MFC 1 (S28). In this case, one (1) is written into the print page counter 53*c*, so that the first page of the image data is read from the HD 57 and transmitted to the MFC 1. The image data transmitted to the MFC 1 is printed by the printer 25 of the MFC 1.

The CPU 51 repeats the image data transmission until the one page of the image data is completely transmitted (S29: NO). When the CPU 51 completely transmits one page of the image data (S29: YES), the CPU 51 determines whether the value in the print page counter 53*c* and that in the original document page counter 53*b* are equal (S30). In this case, the value in the print page counter 53*c* is one (1) and that in the original document page counter 53*b* is two (2), which are not equal. When those values are not equal (S30: NO), the image data for the next page exists. Therefore, the CPU 51 adds one (1) to the value in the print page counter 53*c* (S31) and repeats steps S28 to S31.

In S30, when the value in the print page counter 53*c* and that in the original document page counter 53*b* are equal (when the values in the counters 53*c* and 53*b* are two (2)) (S30: YES), the image data for all original documents, that is, the image data for the first and the second pages of the original documents, is transmitted to the MFC 1. Therefore, the CPU 51 subtracts 1 from the value in the repetition counter 53*a* storing the value for the number of copies (S32). In this case, subtracting 1 from 3, the value in the repetition counter 53*a* reads 2.

When the value in the repetition counter 53*a* is not zero (0) after subtraction (S33: NO), the image data for designated number of copies has not yet been transmitted to the MFC 1. Therefore, the CPU 51 repeats the steps S27 to S32 until the value in the repetition counter 53*a* becomes zero (0).

As a result of subtraction in S32, when the value in the repetition counter 53*a* becomes zero (0) (S33: YES), the image data of all the original documents for the designated number of copies, that is, the image data for three (3) copies of each of two (2) pages of the original documents, is transmitted to the MFC 1. When the image data of all the original documents for the designated number of copies is completely transmitted to the MFC 1, the CPU 51 erases the image data stored in the HD 57 in step S24 (S34), whereupon the color copying processing ends. FIG. 5 shows the input/output of the image data when the color copying processes is performed in sort copying mode for three (3) copies of two (2) pages of the image data.

FIG. 8 is a flowchart illustrating a print task executed by the MFC 1. The CPU 11 repeats step S41 until the image data (binary CMYK data) transmitted from the PC 50, is received for printing. When the image data is received for printing (S41: YES), the CPU 11 repeats step S42 until one path data, which can be printed at one time by a print head in the main scanning direction of the recording sheet, is created with the received image data for printing. When the one path data is created (S42: YES), the CPU 11 prints the one path data on a recording sheet in color by the printer 25 (S43). Until the one page of printing is finished (S44: NO), the CPU 11 repeats steps S41 to S43. When the one page of printing is finished (S44: YES), the CPU 11 discharges the printed sheet from the print sheet discharge opening 8 ($45). Then, the CPU 11 repeats step S41 until new image data is transmitted from the PC 50.

In this embodiment, a first transmission device corresponds to step S7 in FIG. 6. A reception control device corresponds to step S24 in FIG. 7. A second transmission device corresponds to step S28 in FIG. 7. A reception printing device corresponds to step S43 in FIG. 8. A sorting device corresponds to steps S27 to S33 in FIG. 7.

While the invention has been described with reference to the embodiments, it is to be understood that the invention is not restricted to the particular forms shown in the foregoing embodiments. Various modifications and alterations can be made thereto without departing from the scope of the invention.

For example, in the above-described embodiment, the MFC 1 converts by the ASIC 18 the analog RGB data read by the CIS 22a, into the binary CMYK data, and then, transmits the binary CMYK data to the PC 50. However, the analog RGB data read by the CIS 22a may be converted by the ASIC 18, into multi-value CMYK data, and the multi-value CMYK data may be transmitted to the PC 50. In this case, the pseudo-halftone processing by error diffusion 18i shown in FIG. 3 needs to be replaced with a multi-value error diffusion processing. Consequently, the ASIC 18 needs to include the circuits for the multi-value error diffusion processing. In FIGS. 4 and 5, the multi-value CMYK data is transmitted from the MFC 1 to the PC 50 and from the PC 50 to the MFC 1.

For example, although the foregoing embodiment employs an ink-jet color printer 25 as a printing device, the invention may also be applied to other types of printers, for example, a color laser printer or other types of color printers. Further, in the foregoing embodiment, a plurality of original documents are duplicated for example, in the sort copying mode where sets of copies of the original documents are produced. However, the invention may be applied if the original documents are duplicated in the stack copying mode where the designated number of copies are consecutively produced for each page of the original documents in the order of the pages in the original documents.

Figure 9:
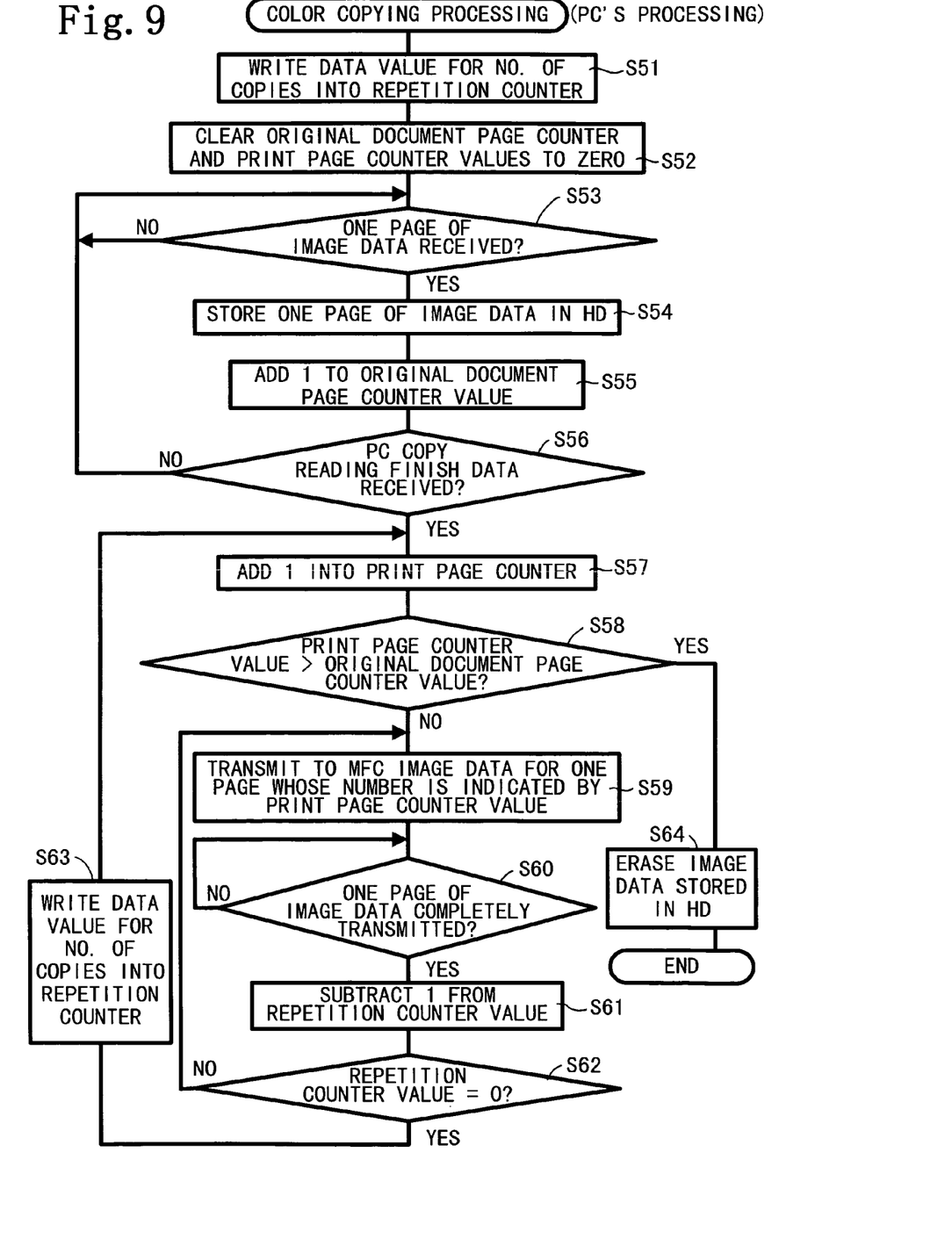
FIG. 9 is a flowchart illustrating one of the color copying processing executed by the color copying application in the PC.

FIG. 9 is a flowchart illustrating one of color copying processing executed by the color copying application 57a stored in the HD 57 of the PC 50. The color copying, such as shown in FIG. 9, starts when the PC 50 receives from the MFC 1 the PC copy start data and the data for the copying mode in which the stack copying mode is designated. In this embodiment, three (3) copies of total of two (2) pages of original documents are produced in the stack copying mode.

In the color copying processing, the PC 50 first receives the data for the number of copies (3) from the MFC 1. The CPU 51 writes the value (3) for the number of copies into the repetition counter 53a (S51). The CPU 51 initializes the original document page counter 53b and the print page counter 53c by clearing the values in the counters 53b and 53c to zero (S52). Then, the CPU 51 repeats step S53 until one page of the image data (binary CMYK data) is received. When one page of the image data is received (S53: YES), the CPU 51 stores the one page of the image data in the HD 57 (S54), and adds one (1) to the value of the original document page counter 53b (S55). Then, the CPU 51 determines whether the PC copy reading finish data transmitted from the MFC 1, is received (S56). If the PC copy reading finish data has not yet been received (S56: NO), the image data for one or more pages exists. Therefore, the CPU 51 repeats steps S53 to S55 for the existing image data. In this embodiment, since the total number of the original documents are two pages, the value in the original document page counter 53b is finally added up to two (2).

Upon the reception of the PC copy reading finish data (S56: YES), the image data (binary CMYK data) for all of the original documents (two pages) have been received. Thereafter, the CPU 51 executes a processing to transmit the received image data to the MFC 1 in the order of printing, according to the operator's designation. First, the CPU 51 writes one (1) into the print page counter 53c (S57). Then, the CPU 51 compares the value (2) in the original document page counter 53b with the value (1) in the print page counter 53c (S58). At this time, the value in the original document page counter 53b is larger than that in the print page counter 53c (S58: NO). Therefore, the CPU 51 reads from the HD 57 the image data (binary CMYK data) for the "n"th page indicated by the value "n" in the print page counter 53c, and transmits the image data to the MFC 1 (S59). In this case, one (1) is written into the print page counter 53c, so that the first page of the image data is read from the HD 57 and transmitted to the MFC 1. The image data transmitted to the MFC 1 is printed by the printer 25 of the MFC 1.

The CPU 51 repeats the image data transmission until the one page of the image data is completely transmitted (S60: NO). When the CPU 51 completely transmits one page of the image data (S60: YES), the CPU 51 subtracts 1 from the value in the repetition counter 53a storing the value for the number of copies (S61). In this embodiment, one (1) is subtracted from the value 3 in the repetition counter 53a, so that the value in the counter 53a becomes two (2). Since the value in the repetition counter 53a is not zero (0) (S62: NO), the image data for all the designated number of copies, has not yet been transmitted to the MFC 1. Therefore, the CPU 51 repeats steps S59 to S61 until the value in the repetition counter 53a becomes zero (0).

In step S62, when the value in the repetition counter 53a is zero (0) (S62: YES), the image data of the first page for three (3) copies as designated by the operator, has been transmitted to the MFC 1. Then, the CPU 51 writes the value (3) for the number of copies into the repetition counter 53a, for the next page of the original documents (S63), as similar to step S51. The CPU 51 also adds one (1) to the value in the print page counter 53c (S57). The value "n" in the print page counter 53c indicates that the image data (binary CMYK data) for the "n"th page of the original documents, is to be transmitted from the PC 50 to the MFC 1. For example, when the value in the print page counter 53c becomes 2 from 1, the image data for the second page of the original document is to be transmitted from the PC 50 to the MFC 1.

Then, the CPU 51 compares the value in the original document page counter 53b with that in the print page counter 53c (S58). At this time, the value (2) in the original document page counter 53b is equal to the value (2) in the print page counter 53c (S58: NO). Therefore, the CPU 51 reads from the HD 57 the image data (binary CMYK data) for the second page, as indicated by the value 2 in the print page counter 53c, and transmits the image data to the MFC 1 (S59).

The CPU 51 repeats the steps S59 to S61 until the value in the repetition counter 53a becomes zero (0). Thereafter, the CPU 51 compares the value (2) in the original document page counter 53b with the value (3) in the print page counter 53c (S58). At this time, the value (2) in the original document page counter 53b is smaller than the value (3) in the print page counter 53c (S58: YES), so that the image data of all the original documents for the designated number of copies, have been transmitted from the PC 50 to the MFC 1. Therefore, the CPU 51 erases the image data stored in the HD 57 in step S54 (S64), whereupon the color copying processing ends.

What is claimed is:

1. A copying system including a host device, a peripheral device connected to the host device, and a printing device, the peripheral device comprising:
   a reading device that reads an image on an original document as image data;
   a converting device that converts the image data read by the reading device, into printable data;
   a first transmission device that transmits to the host device the printable data converted by the converting device; and a reception printing device that receives the printable data converted by the converting device and transmitted from the host device and causes the printing device to print the printable data;
the host device comprising:
a storage device that stores various data;
a reception control device that receives the printable data transmitted from the first transmission device, and stores the printable data in the storage device; and
a second transmission device that transmits to the peripheral device the printable data stored in the storage device by the reception control device,
wherein the peripheral device and the printing device are incorporated into one body, and
wherein when a copying is started, the reading by the reading device, the conversion by the converting device, the transmission by the first transmission device, the reception and the storing by the reception control device, the transmission by the second transmission device and the reception and the printing by the reception printing device are performed successively based on the start of copying.

2. The copying system according to claim 1, the host device further comprising:
a sorting device that sorts the printable data stored in the storage device in an order of printing for printing by the printing device,
wherein the second transmission device transmits to the peripheral device the printable data sorted by the sorting device, in the sorted order.

3. The copying system according to claim 2, further comprising:
an input device that inputs a designation provided by an operator,
wherein the sorting device sorts the printable data according to the operator's designation input by the input device.

4. The copying system according to claim 2, wherein the sorting device sorts the printable data in an order of printing in either a stack mode where a plurality of copies are consecutively produced for each original document, or a sort mode where a plurality of copies are produced as a set of the original documents.

5. The copying system according to claim 1, wherein the printing device performs color printing using a plurality of inks, and the converting device converts the image data read by the reading device, into binary data corresponding to the colors of inks included in the printing device.

6. The copying system according to claim 1, wherein the converting device includes an application-specific integrated circuit.

7. The copying system according to claim 1, wherein the printing device performs color printing using a plurality of inks, and the converting device converts the image data read by the reading device, into multi-value data corresponding to the colors of inks included in the printing device.

8. A copying system including a host device having, in one body, a large-capacity storage device and a peripheral device connected to the host device, the peripheral device having a reading device that reads an image on a color original document and a printing device that prints data read by the reading device, in color, comprising:
a converting device that converts image data of the color original document read by the reading device, into printable data that can be printed by the printing device;
a first transmission device that transmits the data converted by the converting device to the host device from the peripheral device;
a reception control device that receives the data transmitted by the first transmission device and stores the data in the storage device;
a second transmission device that transmits the data stored in the storage device by the reception control device to the peripheral device from the host device; and
a reception printing device that receives the data transmitted by the second transmission device and causes the printing device to print the data,
wherein when a copying is started, the reading by the reading device, the conversion by the converting device, the transmission by the first transmission device, the reception and the storing by the reception control device, the transmission by the second transmission device and the reception and the printing by the reception printing device are performed successively based on the start of copying.

9. The copying system according to claim 8, the host device further comprising:
a sorting device that sorts the data received and stored in the storage device, in an order of printing by the printing device, without converting the data;
wherein the second transmission device sequentially transmits the data sorted by the sorting device to the peripheral device.

10. The copying system according to claim 9, further comprising:
an input device that inputs a designation provided by an operator;
wherein the sorting device sorts the printable data according to the operator's designation input by the input device.

11. The copying system according to claim 9, wherein the sorting device sorts the printable data in an order of printing in either a stack mode where a plurality of copies are consecutively produced for each original document, or a sort mode where a plurality of copies are produced in a set of the original documents.

12. The copying system according to claim 8, wherein the printing device performs color printing using a plurality of inks, and the converting device converts the image data read by the reading device, into binary data corresponding to the colors of inks included in the printing device.

13. The copying system according to claim 8, wherein the converting device includes an application-specific integrated circuit.

14. The copying system according to claim 8, wherein the printing device performs color printing using a plurality of inks, and the converting device converts the image data read by the reading device, into multi-value data corresponding to the colors of inks included in the printing device.

15. A method of copying operating a copying system that includes a host device, a peripheral device connected to the host device, and a printing device, the peripheral device and the printing device being incorporated into one body, the method comprising steps of:
at the peripheral device:
a reading step of reading an image on an original document as image data;
a converting step of converting the image data read in the reading step into printable data;
a first transmitting step of transmitting to the host device the printable data converted in the converting step; and a reception printing step of receiving the printable data converted in the converting step and transmitted from the host device and causing the printing device to print the printable data;

at the host device:

a reception control step of receiving the printable data transmitted from the peripheral device in the first transmitting step;

a storing step of storing the printable data received in the receiving step in a storage device; and a second transmitting step of transmitting to the peripheral device the printable data stored in the storage device in the storing step, wherein when a copying is started, the reading step, the conversion step, the first transmission step, the reception control step, the storing step, the second transmission step and the reception printing step are performed successively based on the start of copying.

16. The method according to claim 15, further comprising:

a sorting step of sorting, at the host device, the printable data stored in the storage device in an order of printing for printing by the printing device, wherein the second transmitting step includes transmitting the printable data sorted by the sorting device, in the sorted order.

17. The method according to claim 16, further comprising:

an inputting step of inputting a designation provided by an operator, wherein the sorting step sorts the printable data according to the inputting step.

18. The method according to claim 16, wherein the sorting step sorts the printable data in an order of printing in either a stack mode where a plurality of copies are consecutively produced for each original document, or a sort mode where a plurality of copies are produced as a set of the original documents.

19. The method according to claim 15, wherein the printing device performs color printing using a plurality of inks, and the converting step converts the image data read in the reading step, into binary data corresponding to the colors of inks included in the printing device.

20. The method according to claim 19, further comprising:

a sorting step of sorting, at the host device, the printable data stored in the storage device in an order of printing for printing by the printing device, wherein the second transmitting step includes transmitting the printable data sorted in the sorting step, in the sorted order.

21. The method according to claim 20, further comprising:

an inputting step of inputting a designation provided by an operator, wherein the sorting step sorts the printable data according to the inputting step.

22. The method according to claim 15, wherein the converting step uses an application-specific integrated circuit.

23. The method according to claim 15, wherein the printing device performs color printing using a plurality of inks, and the converting step converts the image data read in the reading step, into multi-value data corresponding to the colors of inks included in the printing device.

* * * * *